Aug. 15, 1944.  F. L. ROXS ET AL  2,355,679
SLIP-ON LOCK DEVICE
Filed Nov. 11, 1942
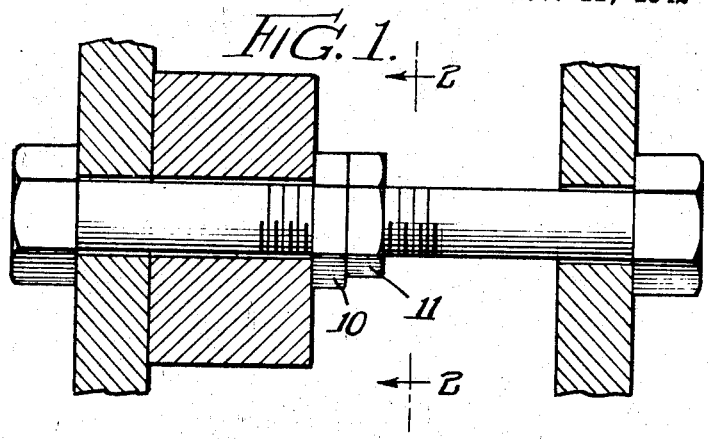
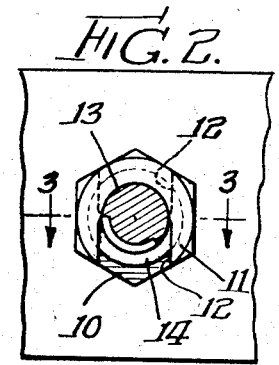
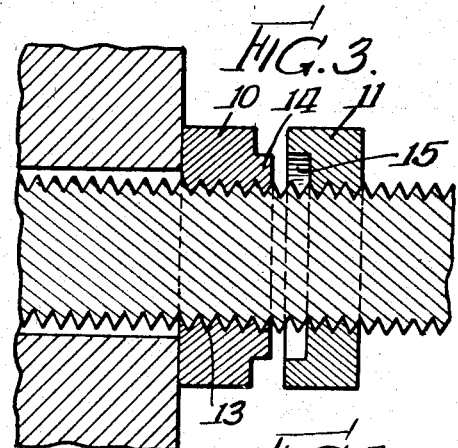
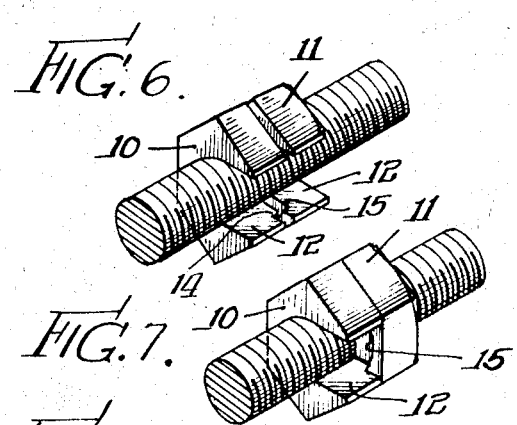
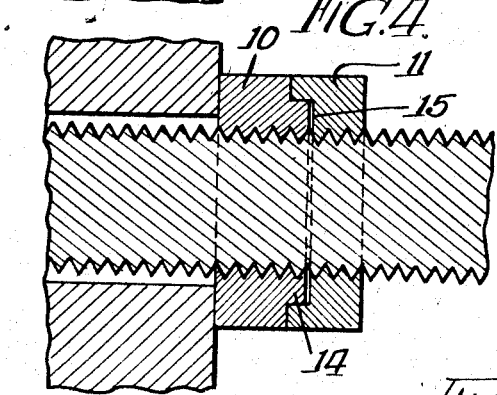
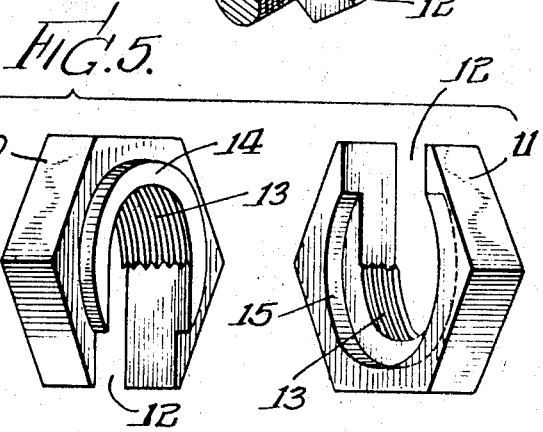
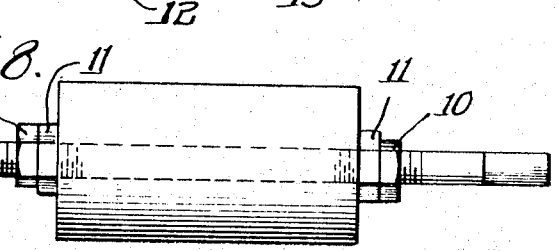
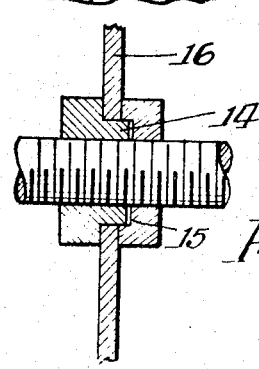
INVENTORS.
Frank L. Roxs
Archie MacDonald
By:- Loftus, Moore, Olson & Trexler
Attys.

Patented Aug. 15, 1944

2,355,679

UNITED STATES PATENT OFFICE 2,355,679

SLIP-ON LOCK DEVICE

Frank L. Roxs and Archie Macdonald, Evanston, Ill.; said Macdonald assignor to said Roxs Application November 11, 1942, Serial No. 465,200

4 Claims. (Cl. 85—32)

It is an object of our invention to provide a locking device adapted to be slipped transversely onto a screw-threaded bolt, shaft, bar or the like, and readily and quickly securely locked in place thereon.

A further object of our invention is to provide a slip-on locking device which may be readily and quickly applied and locked in position intermediate the ends of a mounted bolt or shaft.

It is a further object of our invention to provide a rotary internally screw-threaded nut locking device which may be readily and quickly applied to a bolt or shaft without passing it over either end thereof.

One of the important advantages of our slip-on nut locking device is that it can be readily and quickly applied intermediate the ends of a bolt or shaft already fixed and mounted without disturbing such mounting.

A further advantage of our slip-on locking device is that it may be readily and quickly applied to a previously installed bolt or shaft for mounting on said bolt or shaft intermediate its ends other objects, and for readily adjusting the position of such mounted objects intermediate the ends of the bolt or shaft.

A further advantage of our locking device is that it obviates the necessity of screw-threading either end of bolt or shaft on which it is mounted.

The above objects and advantages will become apparent from a detailed description of the accompanying drawing in which we have illustrated a locking device embodying one form of our invention, but the construction there shown is, however, to be understood as illustrative only and not as defining the limits of our invention.

In the drawing:

Fig. 1 is an elevational view of a bolt, having fixed heads mounted in supports, the latter in section showing our locking device applied to the bolt intermediate the ends for securing a member in place on the bolt.

Fig. 2 is an end view of our slip-on locking device taken substantially on the line 2—2 of Fig. 1, looking in the direction indicated by the arrows.

Fig. 3 is a cross sectional view taken substantially on the line 3—3 of Fig. 2 before the nuts or units of our device are rotated into locking position.

Fig. 4 is a view similar to Fig. 3 with the nuts or units rotated into locking position.

Fig. 5 is a perspective view, the two cooperating nuts or units of our locking device showing a collar on the opposed surface of one nut or unit and a cooperating female groove in the opposed surface of the other nut or unit.

Fig. 6 is a perspective view showing the cooperating slip-on nuts or units after being slipped onto the bolt and before rotating to locked position.

Fig. 7 is a similar view showing the cooperating units after being rotated substantially a quarter-turn into locked position.

Fig. 8 illustrates the application of our slip-on nut locking device for mounting a roller or the like on a shaft intermediate its ends.

Fig. 9 shows a slight modification of our locking device with a member or body mounted between the cooperating units on a shaft.

Referring to the drawing in detail, our device consists of two units or nuts 10 and 11. The general contour of these nuts may be of any form or shape; that is, square, hexagon, or round, etc. Each is provided with a slot 12 extending from its periphery to an interior threaded bore 13. The width of each slot is equal to the outside diameter of the threads in the bore 13. The slots extend inwardly to the center of the nuts as best shown in Fig. 5. The nut or unit 10 is integrally provided with an arcuate collar or flange 14 which extends from one side of the slot 12 to its opposite side. This collar is designed to register with a female arcuate bore or groove 15 formed in the nut or unit 11. The female bore or groove in the unit 11 extends cylindrically from one side to the opposite side of the slot 12. Its depth is slightly greater than the height or axial thickness of the flange or collar 14, so that when the units or nuts are rotated into locking position on screw-threaded bolt, shaft, or the like, the outer edge of the collar 14 does not bear against the bottom of the female groove in the unit 11 and thus permits the opposed faces of the nuts to tightly engage each other, as best shown in Fig. 4, or to tightly engage an object mounted between the units as best shown in Fig. 9, so that the thrust is taken up and imposed upon the opposed faces of the nuts or units.

In utilizing our locking device, the complementary units or nuts 10 and 11 are preferably arranged in matching relation and then slipped transversely onto a screw-threaded bolt or shaft, (the nut or bolt being received through the open slots), to the position shown in Fig. 6, whereupon the nuts or units 10 and 11 are turned in opposite directions on the screw-threaded portion of the bolt or shaft. As a result, the screwthreads in the units registering with the screwthreads on the bolt or shaft cause the opposed surfaces of the units to engage and tightly jam, thus locking the complete device on the bolt or shaft as a complete unit.

When it is desired to use our locking device for mounting a body between the units 10 and 11, such as the partition 16 or the like, as shown in Fig. 9, the collar 14 on one unit and the cooperating female groove in the opposed face of the other unit are greatly increased so as to leave the desired space between the opposed bearing surfaces of the units in order to receive there between in resting position on the collar the object desired to be mounted.

From the foregoing description and drawing, it will be clear, we submit, that we have provided a slip-on locking device having all the objects and functions heretofore pointed out, as well as many other inherent advantages not necessary to mention here.

While we have herein mentioned a few of the uses to which our locking device may be put, it is adapted to many other uses not here mentioned.

Having thus described our invention, we claim:

1. A slip-on locking device adapted to be transversely slipped onto a screw-threaded bolt or shaft comprising in combination a pair of opposed nuts, each of said nuts having an arcuately screw-threaded bore, and each having an open slot extending from their outer peripheral edge to the center thereof, each slot having a width which is sufficient to receive a screw member complementary to the arcuate threads in the bore, an arcuate collar on the face of one of said nuts extending from one edge of the slot to the opposite edge and a female socket on the opposed face of the other nut for receiving and registering with said collar.

2. A slip-on locking device adapted to be transversely slipped onto a screw-threaded bolt or shaft comprising in combination a pair of opposed nuts, each of said nuts having an arcuately screw-threaded bore and each having an open slot extending from their outer peripheral edge to the center thereof, each slot having a width which is sufficient to receive a screw member complementary to the arcuate threads, an arcuate collar on the face of one of said nuts extending from one edge of the slot to its opposite edge and a female socket on the opposed face of the other nut extending from one edge of the slot to its opposite edge for receiving and registering with said collar, said female groove being deeper than the height of said collar.

3. A slip-on locking device comprising in combination a pair of interiorly-threaded nuts or units, each provided with an open slot extending substantially from their centers to their outer periphery a collar formed on the opposed face of one of said units for supporting a body thereon, and a female socket in the opposed face of the other unit adapted to receive said collar for registration therewith said interiorly screw-threaded nuts being adapted to be brought into locked position on a bolt by rotating said nuts in opposite directions.

4. A slip-on locking device adapted to be transversely slipped onto a screw-threaded bolt or shaft comprising in combination a pair of opposed nuts, each of said nuts having an arcuately screw-threaded bore, and each having an open slot extending from their outer peripheral edge to the center thereof, each slot having a width which is sufficient to receive a screw member complementary to the arcuate threads in the bore, an arcuate female socket of more than 180° in the opposed face of one of said nuts extending from one edge of the slot to the opposite edge, and rigid extending means on the opposed face of the other nut adapted to rotate in said female socket and to interlock with said arcuate female socket to prevent the transverse separation of said nuts when rotated into locked position.

FRANK L. ROXS.
ARCHIE MACDONALD.